United States Patent [19]
Ohara et al.

[11] Patent Number: 4,535,342
[45] Date of Patent: Aug. 13, 1985

[54] METHOD OF AND SYSTEM FOR LASER BEAM RECORDING

[75] Inventors: Yuji Ohara; Kazuo Horikawa, both of Kanagawa, Japan

[73] Assignee: Fuji Photo Film Co., Ltd., Japan

[21] Appl. No.: 571,142

[22] Filed: Jan. 17, 1984

Related U.S. Application Data

[63] Continuation of Ser. No. 309,131, Oct. 6, 1981, abandoned.

[30] Foreign Application Priority Data

Oct. 9, 1980 [JP]  Japan ................... 55-141443

[51] Int. Cl.$^3$ .................. G01D 9/42; G01D 15/04
[52] U.S. Cl. ......................... 346/108; 346/160
[58] Field of Search ............... 346/1.1, 108, 160; 350/6.6; 354/5

[56] References Cited

U.S. PATENT DOCUMENTS 4,178,064 12/1979 Mrdjen .................. 350/6.6
4,245,228  1/1981 Cook .................... 346/108
4,267,548  5/1981 Kimura et al. ........... 346/108 X
4,293,202 10/1981 Ohnishi et al. ........... 346/108 X
4,390,882  6/1983 Ohara et al. ............. 346/1.1

Primary Examiner—A. D. Pellinen
Assistant Examiner—Derek S. Jennings
Attorney, Agent, or Firm—Sughrue, Mion, Zinn, Macpeak, and Seas

[57] ABSTRACT

A recording laser beam is intensity-modulated and is caused to scan a photosensitive recording material in both the main and sub scanning directions. The position of the recording laser beam on the recording material in the main scanning direction is detected and position reference pulses are generated each time the laser beam moves along the recording material in the main scanning direction by a predetermined constant distance. The recording laser beam is intensity-modulated only for a predetermined constant time interval between each pair of adjacent position reference pulses and is made essentially null for the rest time interval between the adjacent position reference pulses so that a unit area of the recording material corresponding to one picture element is exposed to the recording laser beam for a predetermined constant time interval regardless of fluctuation in the scanning speed of the recording laser beam.

3 Claims, 5 Drawing Figures

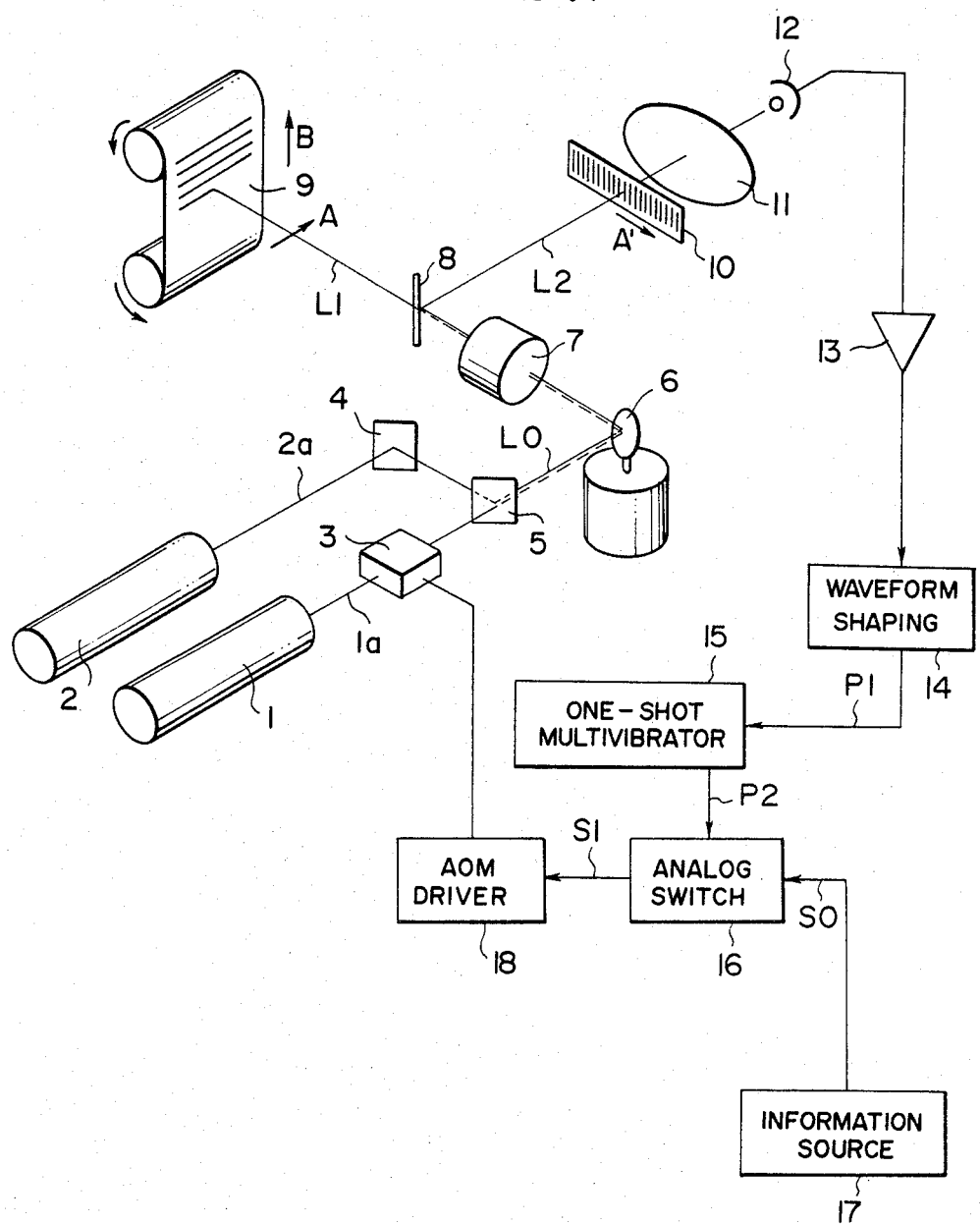

METHOD OF AND SYSTEM FOR LASER BEAM RECORDING

This application is a continuation of application Ser. No. 309,131, filed Oct. 6, 1981 now abandoned.

BACKGROUND OF THE INVENTION

1. Field of the Invention

This invention relates to a method of and a system for laser beam recording in which a laser beam is caused to two-dimensionally scan a photosensitive recording material, and more particularly to an improvement of a method of and a system for laser beam recording in which a laser beam is intensity-modulated in accordance with an analog image signal and is caused to scan a photosensitive recording material capable of recording a half tone image.

2. Description of the Prior Art

In a laser beam recording system in which a laser beam is caused to two-dimensionally scan a photosensitive recording material, it is difficult to record an image having a delicate gradation faithful to an image signal used to modulate the laser beam because the scanning performance of the means for deflecting the laser beam in the main scanning direction, e.g., a galvanometer mirror, is not sufficiently linear, that is, the scanning speed of the laser beam along the recording material in the main scanning direction varies as the angle of scanning direction varies.

When the laser beam moves slowly along the recording material, the corresponding part of the recording material receives a relatively large amount of light per unit area even if the intensity of the laser beam is constant, while when the laser beam rapidly moves along the recording material, the corresponding part of the recording material receives a relatively small amount of light even if the intensity of the laser beam is constant. Thus different recording densities will appear for the same level of the image signal used for intensity-modulating the laser beam. Accordingly, the gradation of the recorded image cannot be produced faithfully to the image signal. This is generally referred to as "density unevenness".

Theoretically, this problem can be solved by controlling the deflecting operation of the galvanometer mirror with a high accuracy so that the scanning speed of the laser beam is made constant over the entire area of the recording material in the main scanning direction. However, this solution would be very difficult and costly to carry out, and would, as a practical matter, be almost impossible.

SUMMARY OF THE INVENTION

The primary object of the present invention is, therefore, to provide an improved laser beam recording method capable of recording an image having continuous half tone gradation faithful to the image signal used for modulating the laser beam without density unevenness, even if the scanning speed is not constant.

Another object of the present invention is to provide a laser beam recording system for carrying out the above method.

According to the present invention, a position reference pulse is generated each time the recording laser beam moves along the recording material by a predetermined distance in the main scanning direction, and recording is actually performed only for a predetermined constant time interval between adjacent position reference pulses with the intensity of the recording laser beam being made essentially null for the rest time therebetween, whereby the actual recording time interval between the pulses is made constant.

In one embodiment of the present invention, an analog switch is provided between a light modulator and an image signal generating means, and the image signal is fed to the light modulator only for a predetermined constant time interval between adjacent position reference pulses under the control of the analog switch. The average amount of light received by the recording material per unit area is thus made constant for the same intensity level of the laser beam, whereby the recording density can be made constant so long as the intensity of the laser beam is constant even if the scanning speed of the laser beam fluctuates.

The term "analog switch" should be broadly interpreted so as to include any type of switching means which can turn the analog image signal fed to the light modulator on and off.

BRIEF DESCRIPTION OF THE DRAWINGS

FIG. 1 is a schematic view showing a laser beam recording system in accordance with an embodiment of the present invention.

DESCRIPTION OF THE PREFERRED EMBODIMENT

Figure 2A:
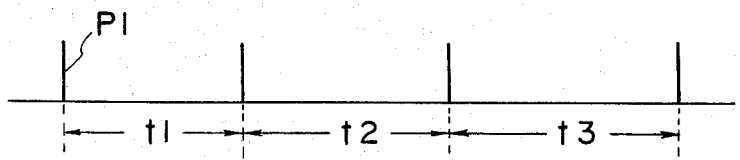
FIGS. 2A to 2D are waveform diagrams of pulses used in the laser beam recording system of FIG. 1.

FIG. 1 shows a laser beam recording system in accordance with an embodiment of the present invention in which a pair of laser sources are used, one for emitting a recording laser beam, and the other for emitting a reference laser beam used for referencing or detecting the position of the recording laser beam. In this embodiment the reference laser beam is once synthesized with the recording laser beam and again separated therefrom after being deflected in the main scanning direction. In the sub scanning direction, the laser beams are caused to scan a recording material by moving the recording material in the direction perpendicular to the main scanning direction with respect to the laser beams.

Now referring to FIG. 1, a laser beam 1a which may be blue for example, is emitted from a recording laser beam source 1, while a laser beam 2a which may be red, for example, is emitted from a reference laser beam source 2. The laser beams 1a and 2a are synthesized by means of a half-silvered mirror 5 to form a single synthesized beam L0 after the laser beam 1a is modulated by an acousto-optic (AO) modulator 3 and the laser beam 2a is reflected by a mirror 4. The synthesized beam L0 is deflected by a galvanometer mirror 6 and passes through a scanning lens 7. After passing through the scanning lens 7, the synthesized beam L0 is again divided into a recording laser beam L1 and a reference laser beam L2 by means of a beam splitter 8. The recording laser beam L1 scans a recording material 9 in the main scanning direction as indicated by an arrow A under the control of the galvanometer mirror 6, while the reference laser beam L2 scans a linear encoder 10 at a speed equal to the scanning speed of the recording laser beam L1 in the direction indicated by an arrow A'. Thus the position of the reference laser beam L2 on the linear encoder 10 corresponds to the position of the recording laser beam L1 on the recording material 9. The scanning of the recording laser beam in the sub scanning direction is effected by moving the recording material 9 in the direction as indicated by an arrow B perpendicular to the main scanning direction A.

Figure 2B:
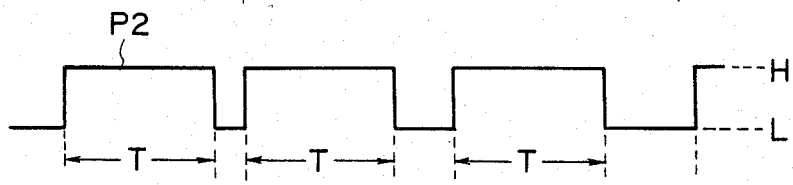
Figure 2C:
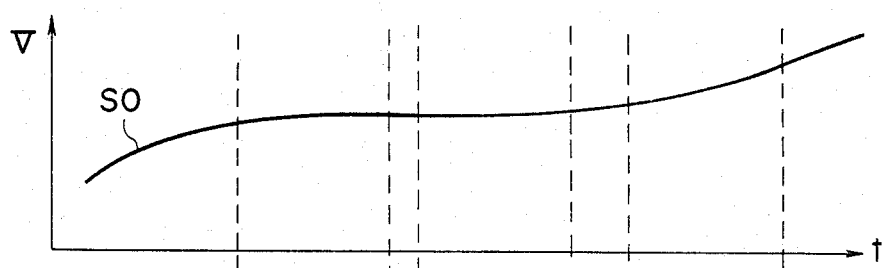

The linear encoder 10 has a plurality of transparent stripes regularly arranged in the direction of the arrow A'. Behind the linear encoder 10 is disposed a condenser 11. The reference laser beam L2 passing through the transparent stripes of the linear encoder 10 is focused by the condenser 11 and is introduced into a photodetector 12 disposed therebehind. The output of the photodetector 12 is inputted into a waveform shaper 14 through a preamplifier 13. The waveform-shaped position reference pulses P1 (FIG. 2A) appear at different time intervals as indicated at t1, t2, t3 . . . due to the non-linearity of the scanning performance or speed of the galvanometer mirror 6. The position reference pulses P1 are inputted into a one-shot multivibrator 15. The one-shot multivibrator 15 generates pulses P2 (FIG. 2B) of a constant width T which are triggered at the rise-up point of each position reference pulse P1. The pulses P2 are fed to an analog switch 16 to close it to permit transfer of an image signal from an information source 17 to an acousto-optic modulator driver (AOM driver) 18.

Figure 2D:
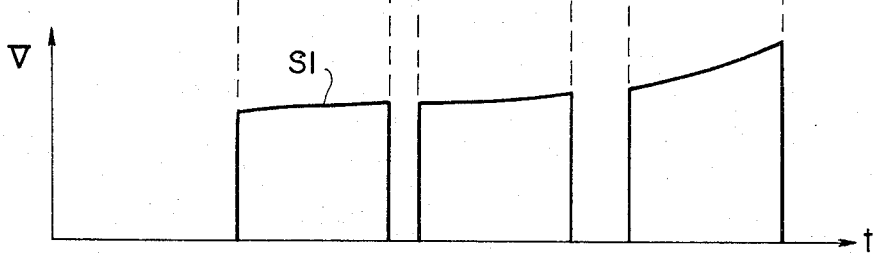

The analog switch 16 is connected between the information source 17 which outputs an image signal S0 for an image to be recorded and the AOM driver 18. When the pulses P2 are at high level H, the analog switch 16 permits transfer of the image signal S0 from the information source 17 to the AOM driver 18, while when the pulses P2 are at low level L, the analog switch 16 prevents the image signal S0 from being transferred to the AOM driver 18. Accordingly, the image signal S0 is transferred to the AOM driver 18 only for the time interval of T. Therefore, the image signal actually inputted into the AOM driver 18 has a shape obtained by removing parts from the image signal S0 output from the information source 17 as indicated at S1 in FIG. 2D.

Since the AO modulator 3 is driven by the AOM driver 18, the recording laser beam 1a is intensity-modulated only for the constant time interval T between two adjacent position reference pulses P1 and the intensity thereof is made essentially null for the rest time interval between the two position reference signals P1 so that recording is not performed.

As described above with respect to one embodiment, in the present invention, recording is effected for predetermined constant time intervals between adjacent position reference pulses P1. Accordingly, each unit area of the recording material corresponding to one picture element is always exposed to the recording laser beam for a constant time interval regardless of variations in the scanning speed of the recording laser beam, whereby each recorded picture element can be made faithful to the analog image signal S0.

Of course, the present invention is not be limited to the above embodiment. For example, although in the above embodiment only the main scanning is effected by means of a light deflecting means and the sub scanning is effected by mechanically moving the recording material with respect to the recording laser beam, the sub scanning may also be effected by means of a light deflecting means such as a galvanometer mirror or a rotating multi-facet mirror without mechanically moving the recording material. Also in this case the position reference laser beam should be separated from the recording laser beam after being deflected by deflecting means in the main scanning direction. It is also possible to divide a laser beam emitted from a single laser source into two beams, one for the recording beam, the other for the reference beam instead of using two laser sources. In this case the intensity of the recording laser beam may somewhat be lowered. However, there is no problem insofar as the sensitivity of the recording material is high enough.

Further, the analog switch 16 may be connected between the AOM driver 18 and the AO modulator 3.

Further, any other suitable means can be used in place of the one-shot multivibrator 15 to close the analog switch 16 for a predetermined constant time interval between the position reference pulses P1. For example, there may be used means which generates a pulse to close the analog switch for a very short time interval after a position reference pulse P1 and generates another pulse to open the analog switch for a relatively long time interval thereafter.

Further, said pulse P2 of a constant width is triggered at the rise-up point of the position reference pulses P1. However, the pulse P2 may be triggered at the trailing edge of the position reference pulses P1.

We claim:

1. A laser beam recording system conprising an image signal generating means, a laser source, a light modulator for modulating a laser beam emitted from the laser source in accordance with the image signal generated by the image signal generating means, a photosensitive recording material capable of recording half tone images, means for causing the modulated laser beam to two-dimensionally scan the photosensitive recording material in a main and sub scanning directions, means for generating a position reference pulse in response to beam deflection each time the modulated laser beam moves along the photosensitive recording material by a predetermined constant distance in the main scanning direction, switch means for preventing transfer of the image signal to the light modulator for all but a predetermined constant time interval between adjacent position reference pulses; said means for preventing transfer of the image signal comprises an analog switch connected between said image signal generating means and said light modulator, and means connected between the analog switch and the means for generating the position reference pulses for closing the analog switch for said predetermined constant time interval between adjacent position reference pulses.

2. A system as defined in claim 1 in which said means for generating the position reference pulses comprises means for extracting a part of the laser beam after the laser beam is deflected in the main scanning direction, a linear encoder scanned by the extracted part of the laser beam, and means for detecting light passing through the linear encoder.

3. A system as defined in claim 1 in which said means for generating position reference pulses comprises a reference laser beam souce for emitting a reference laser beam which is synthesized with said laser beam to be deflected by a deflecting means together therewith in the main scanning direction, light separating means for extracting the reference laser beam from the synthesized laser beam after the synthesized laser beam is deflected in the main scanning direction, photodetecting means for detecting the extracted reference laser beam and a linear encoder disposed between the light separating means and the photodetecting means.

* * * * *